G. W. BROWN.
Corn Planter.
No. 1,036. Reissued Sept. 11, 1860.
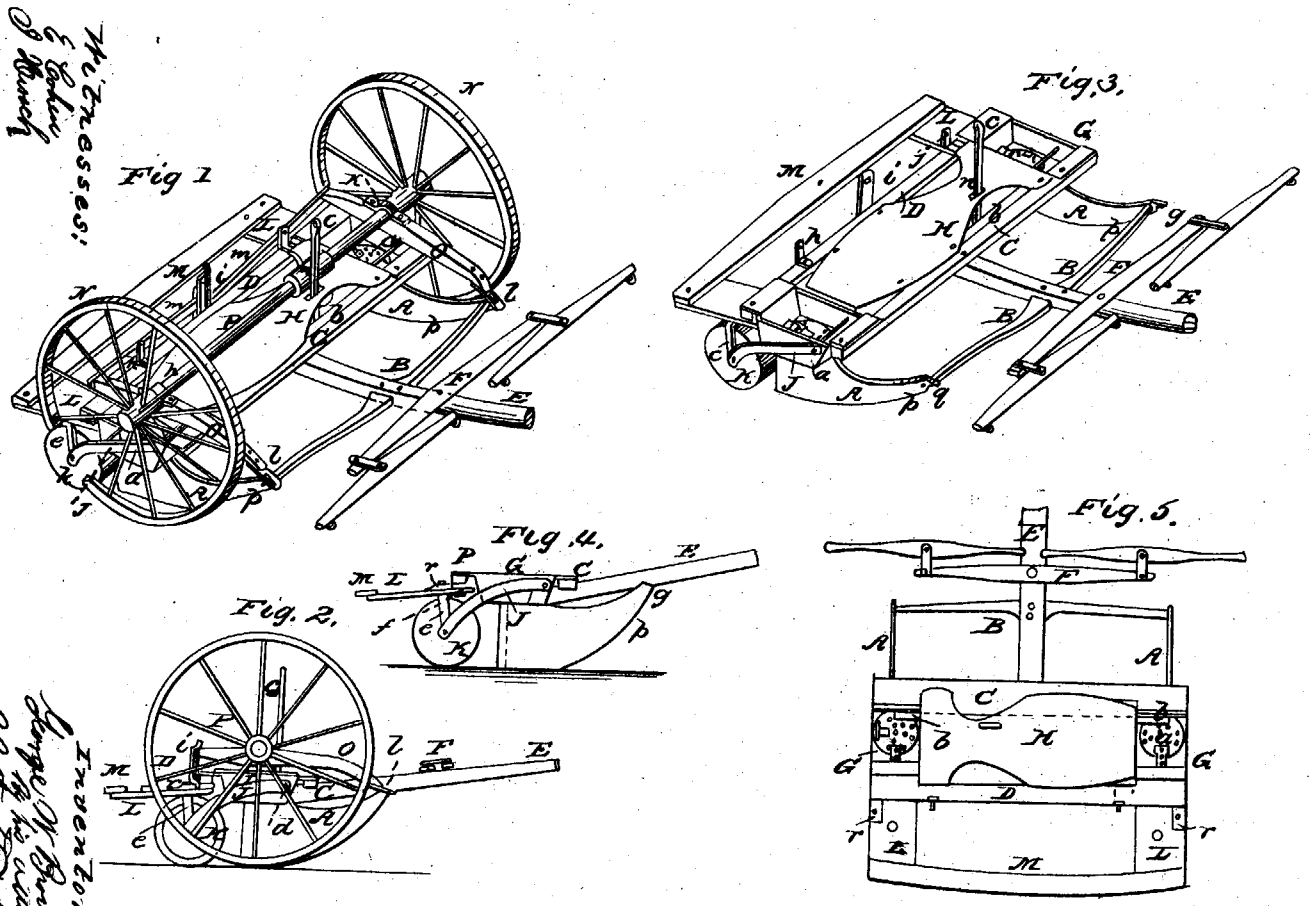
Witnesses:
E Cohen
J Kusch
Inventor:
George W Brown
By his atty
A B Stoughton
N. PETERS, Photo-Lithographer, Washington, D. C.

UNITED STATES PATENT OFFICE.

GEORGE W. BROWN, OF GALESBURG, ILLINOIS.

IMPROVEMENT IN SEED-PLANTERS.

Specification forming part of Letters Patent No. 9,893, dated February 2, 1853; Reissue No. 526, dated February 16, 1858; Reissue No. 1,036, dated September 11, 1860.

*To all whom it may concern:*

Be it known that I, GEORGE W. BROWN, of Galesburg, in the county of Knox and State of Illinois, have invented certain new and useful Improvements in Seed-Planters; and I do hereby declare the following to be a full, clear, and exact description of the construction and operation of the same, reference being had to the accompanying drawings, making a part of this specification, in which—

Figure 1 represents a perspective view of my seed-planting machine arranged for automatic or "machine dropping," as it is termed. Fig. 2 represents a side elevation of the same. Fig. 3 represents the same machine arranged for hand-dropping. Fig. 4 represents a side elevation, and Fig. 5 a top plan, of the machine as arranged for hand-dropping, as shown in Fig. 3.

Similar letters of reference, where they occur in the several figures, denote corresponding parts of the machine in all the drawings.

Corn is planted at that season of the year when the soil is moist and soft, and on the rich soils of the west it is so slippery and mucky in many places as to make what is known as "machine-planting" impossible, as the wheels or their axles are the motive power by which the seed-slides are operated, and as these wheels do not, owing to their slip, advance the machine, or with the machine, regularly over the field, the spaces between the hills or rows are not uniform or in line. This makes the after cultivation of the corn very difficult, as the cultivator moving in a direct line throws up many of the plants. In drier or more sandy and less sticky soils automatic or machine planting may be done. My machine is applicable to either use and to any of the soils, it having peculiar characteristics which make it applicable to either the machine or the hand planting.

The object and purpose of this part of my invention relates to hand-planting machines, in which the person who operates the seed-slides sits or rides on the machine in a convenient position for overlooking his work and governing his motions by the previously-made furrow or marks on or in the ground, so as to preserve regular rows, hills, or spaces between the rows or hills; and this part of my invention consists, first, in a seed-planting machine constructed principally of frame-work, the front part of which is supported on not less than two runners or shoes, and the rear part supported on not less than two wheels, the wheels being arranged to follow in the line of the runners, for a purpose to be hereinafter described.

To enable others skilled in the art to make and use my invention, I will proceed to describe the same with reference to the drawings.

A A represent a pair of runners or shoes, properly braced apart by cross-braces B C D in any manner that will make them sufficiently rigid and at a distance from each other equal to that between the rows or hills of corn.

E is a tongue united to the cross-pieces in any of the usual modes, so as to be midway between the pair of runners or shoes. To this tongue, which may be said to constitute a part of the frame of the machine, the double-trees F, to which the team is hitched, is fastened. The seed-hoppers G G are secured to this frame immediately over the rear of the runners. The seed slides or valves *a*, that allow the grains in measured or regulated quantities to pass out of these hoppers and into the gash or furrow prepared for them by the runners or shoes, are connected together by a bar, *b*, to which a lever, *c*, or its equivalent is attached, so that the attendant from his seat or stand H may readily see the previously-made marks in or on the ground and operate lever *c* to make the droppings conform thereto.

To the side pieces I of the frame are connected two bars or levers, J, (one only being seen, but both alike,) by a pivot-pin or hinged joint at *d* at their front ends, and at their rear ends they slip over the journals of the rollers or wheels K. To these journals are also attached by dead-eyes or bearings the stirrup-straps *e*, to which the pieces L L are attached, the rear ends of said pieces L being connected by a cross-bar, which the driver, who walks in the rear of the machine, may catch hold of, and by raising it up also raise up the rollers, or by pressing it down raise up the runners or shoes out of the ground. The side pieces L are hinged to the cross-piece D of the front frame by bolts passing through slots, as at *f*, or otherwise, so that the rollers may rise and fall without disturbing the runners, or so that the runners may yield or move independently of the rollers. This constitutes mainly the frame-work, which is simple, cheap, strong, and efficient for every purpose. The notch *g* in the front ends of the runners, and the lugs *h i j*, connected to the cross-bar D, are for the purpose of applying the auxiliary wheels N N and converting the machine from a hand to a mechanical dropper; but as this constitutes another branch or division or my invention I will but briefly refer to them here.

When the wheels N N are to be used the two bars O O, on which the boxes or bearings *k* for the axle P are placed, have their eye or loop *l* at their front ends hooked over the notches *g g*, respectively, and the rear ends of these bars O O have arms or levers *m* fastened to them, and which levers have their fulcra at *h j*, and their free ends meet in a guiding and supporting piece, *i*, where, by means of a pin and adjusting holes, they may be regulated so as to raise and lower and hold at any proper height the rear ends of said bars O O, and consequently raise, lower, or hold the wheels N N on them at such regulated height. The wheels and axle being thus placed, a pin, *n*, in the lever *c* takes into the zigzag *o* on the axle, and the seed-slides or valves are then operated automatically, and the attendant riding on the machine is then dispensed with.

The shoes or runners A have an upward-inclining edge, *p*, and a point, *q*, sufficiently high or raised as that it will climb up and over or cut or break through any ordinary intervening obstacle, and it is thin enough so as not to be required to force the earth materially in a lateral direction. It widens out gradually toward its rear end, so as to open a gash or furrow for the seed to drop into. I prefer to make the seed duct or tube *r* in the rear of the shoe or runner, as then the runner will be certain to hold open the gash or furrow until the seeds are dropped into it. The seed-duct should at least follow the furrow-opener near or close enough to allow the seeds to drop into it before the loose earth runs in and fills it. A runner thus made causes but little friction in passing through the earth or soil, and as it is thin and smooth the muck does not cling to it and choke it up, as it would do were it of a wedge form, as heretofore used, with a vertical edge, and requiring much lateral forcing of the earth to open up a furrow.

The hinge-joint at *d* admits of the runners A being raised up out of the ground to pass any obstacle, but particulary in turning the machine around at the ends of the furrows, for unless then raised up it would strain them very much, or its tongue or frame, as said runners or shoes are generally sunk at their rear ends several inches in the soil. In thus raising up the seeding part of the machine or the runners the tongue E, the point of which is attached to the necks of the team, is one fixed point, and the wheels K K make another fixed point, (in relation to the ground,) so that by using the lever M the shoes are raised up and suspended on these fixed points, and it is immaterial whereabout between these fixed points the hinge-joint is, so that the runners are suspended and carried by the point of the tongue and the wheels K.

The attendant, sitting upon his seat H, can readily see the previously made-furrow or mark and as the seed-ducts come to the proper point he shifts his lever, allowing a charge of grain to leave each hopper and pass down into the furrows prepared for them. The rollers K, following after the shoes or runners, close up and press the earth down over the seeds so planted. This makes, as I allege and believe, and as has been proven, the best corn-planting machine ever devised, for it is cheap and efficient, not being subject to the many difficulties incident to other machines for a similar purpose. Where it is best known it is almost universally used, and I believe I am safe in saying that it is the first and only entirely successful machine for planting corn, in a workmanlike manner, in the loamy, mucky soils of the West.

By "a machine composed mainly of frame-work" I mean a machine without gearing, without spoked wheels, and other expensive fixtures, and resembling a drag or sled more than it does a carriage or wagon in its main or general construction. The only wheels I use, though bearing-wheels to a certain extent, are covering-wheels, and thus perform two functions.

*r r* are buttons having one thick and one thin wedge-shaped end. By turning these buttons so that their thick or their thin ends or portions come under the bar D, they define the extent of motion between the hinged part M and the seeding-frame. By turning the buttons entirely out or away from the bar D another adjustment is had.

Having thus fully described the nature and object of my invention, what I claim under this patent is—

A seed-planting machine constructed principally of frame-work, the front part of which is supported on not less than two runners or shoes with upward-inclining edges, and the rear part supported on not less than two wheels, the latter being arranged to follow the former, substantially as and for the purpose set forth.

GEO. W. BROWN.

Witnesses:
A. B. STOUGHTON,
E. COHEN.